United States Patent [19]

Kirschner

[11] Patent Number: 4,697,770

[45] Date of Patent: Oct. 6, 1987

[54] SWAY BRACE FOR PIPING

[75] Inventor: Kraig A. Kirschner, Chino, Calif.

[73] Assignee: Automatic Fire Control, Inc., South El Monte, Calif.

[21] Appl. No.: 867,917

[22] Filed: May 29, 1986

[51] Int. Cl.⁴ ............................................. E21F 17/02
[52] U.S. Cl. ........................................ 248/62; 248/741
[58] Field of Search ....................... 248/62, 74.4, 74.1, 248/58, 65, 56, 214, 72, 313, 316.1, 230, 74.5; 403/395, 399, 362; 24/460

[56] References Cited

U.S. PATENT DOCUMENTS

| | | | |
|---|---|---|---|
| 950,361 | 2/1910 | Woods | 248/214 X |
| 1,674,305 | 6/1928 | Sedlock et al. | 248/214 X |
| 3,570,794 | 3/1971 | Kirschner | 248/62 X |
| 4,149,693 | 4/1979 | LoNigro | 248/214 X |
| 4,584,813 | 4/1986 | Hudson | 248/214 X |

Primary Examiner—Ramon O. Ramirez
Attorney, Agent, or Firm—Lyon & Lyon

[57] ABSTRACT

An improved sway brace for use in building structures for securing a fluid pipe line to an elongated bracing element which is anchored to the structure. The sway brace includes a flat generally U-shaped clamping member adapted to extend traversely about the pipe to be braced for securing the pipe to the bracing element. One end of the clamping member has a first aperture extending therethrough adapted to receive the elongated bracing element. The other end thereof is bent backwardly to define an inverted U-shaped configuration having apertures extending therethrough in axial alignment with the first aperture and also being adapted to receive the bracing element. A bolt member extends through and its in threaded engagement with the inverted U-shaped end of the clamping member for bearing against the bracing element and thereby securing the clamping member to the bracing element and the pipe to the building structure so as to limit relative movement therebetween.

4 Claims, 3 Drawing Figures

SWAY BRACE FOR PIPING

BACKGROUND OF THE INVENTION

This invention relates to sway braces for use in building structures for securing a fluid line to the structure to brace the line against damaging movement such as could result from a seismic disturbance. The sway brace of the present invention is adaptable for securing numerous types of fluid supply lines. An example of a use for which the sway brace of the present invention is particularly suited is to secure fire control water sprinkler distribution pipes. Where sprinkler systems are used in buildings it is required that the water distribution pipes be adequately braced so that in the event of an earthquake, the pipes will not unduly sway relative to adjacent portions of the building and separate or produce excessive leakage at the pipe joints.

Various types of sway brace structures have been developed for this purpose. An example of such a brace is found in U.S. Pat. No. 3,570,794. While the device disclosed therein it does provide adequate protection against relative sway, it tends to produce excessive force directly on the water pipe being braced thereby creating a possibility of damage to the pipe and rendering the device unsuited for use with plastic pipe. It would be highly desirable to provide a sway brace which maintains the securement quality, convenient installation and economy of manufacture features of the aforesaid patented device but which obtains securement of the pipe without the need to exert potentially damaging forces directly against the pipe. The sway brace disclosed and claimed herein achieves these goals.

SUMMARY OF THE INVENTION

The present invention comprises an improved sway brace for use in building structures for securing a fluid pipeline to an elongated bracing element anchored to the structure. The sway brace includes a flat clamping member which is adapted to extend about the pipe to be braced and wherein one end of the clamping member has a first aperture extending therethrough adapted to receive the elongated bracing element. The other end of the bracing member is bent backwardly so as to define an inverted U-shaped configuration having apertures extending therethrough in axial alignment with the first aperture also adapted to receive the elongated bracing element and thereby connect the ends of the sway brace to the elongated bracing element. A threadably engaged locking bolt extends through the inverted U-shaped end of the clamping member which is adapted to be tightened against the elongated bracing element for tightly securing the U-shaped end of the clamping member tightly to the bracing element and concurrently securing the pipe to the bracing element to restrict relative movement of the pipe with respect to the structure.

It is the principal object of the present invention to provide an improved sway brace for securing fluid pipes in building structures without unduly stressing the pipe.

It is another object of the present invention to provide an improved sway brace for use in securing pipes in building structures which is economical to manufacture and easy to install.

These and other objects and advantages of the present invention will become readily apparent from the following detailed description taken in conjunction with the accompanying drawings.

IN THE DRAWINGS

DESCRIPTION OF THE PREFERRED EMBODIMENT

Figure 1:
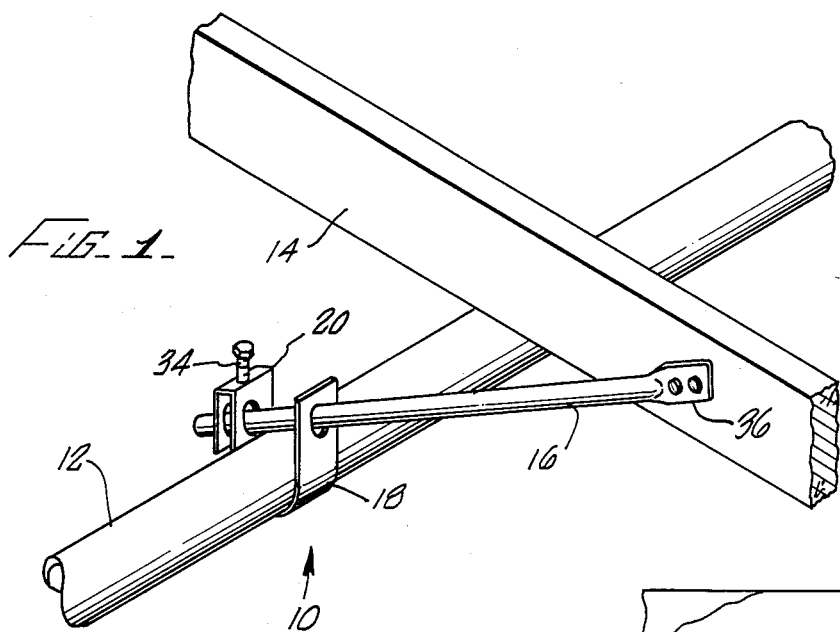
FIG. 1 is a perspective view of a section of distribution pipe supported from building joists and braced with one of the sway braces of the present invention.
Figure 2:
FIG. 2 is an enlarged side view of the sway brace of the present invention securing a fluid pipe to an elongated bracing element.
Figure 3:
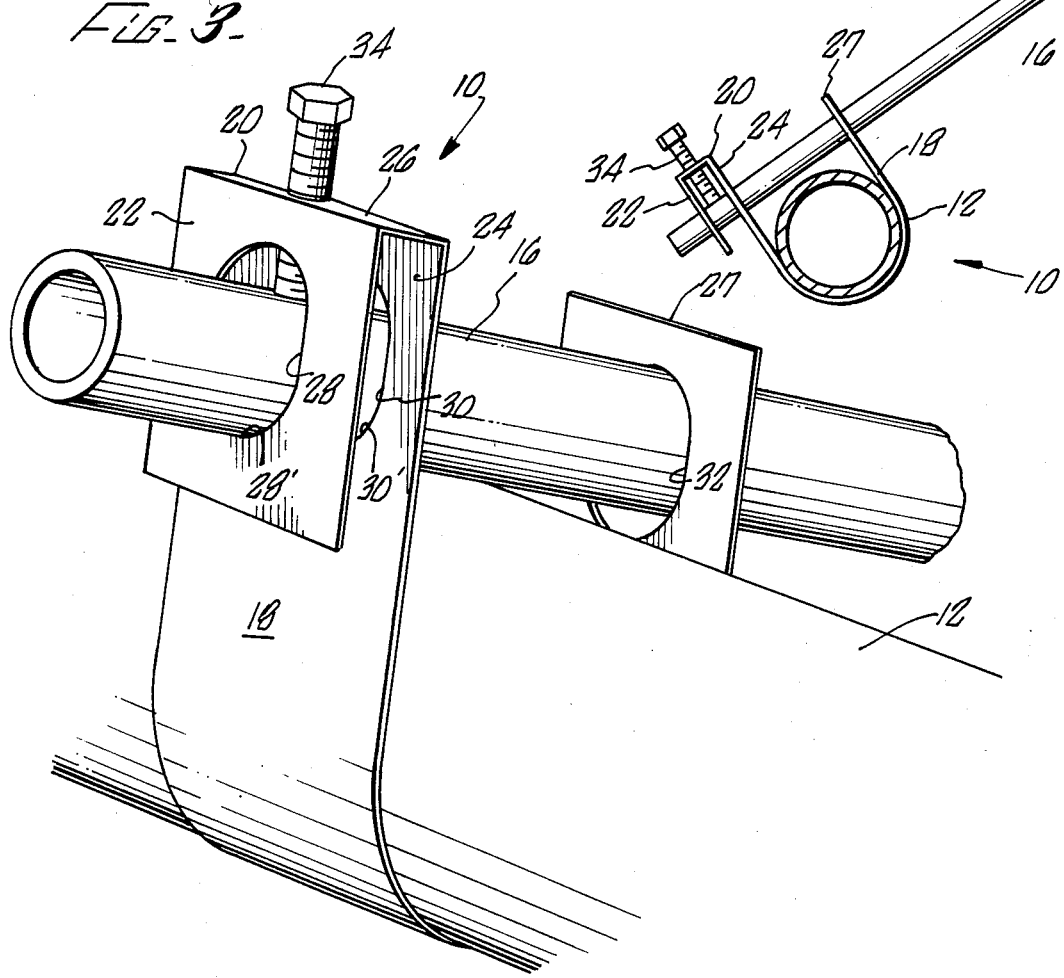
FIG. 3 is an enlarged perspective view of the sway brace of the present invention.

Referring now in detail to the drawings, the sway brace 10 of the present invention is shown in use in FIG. 1 securing a water pipe 12 such as that employed in an interior sprinkler system to a floor joist 14 of a building structure. As seen therein, the brace 10 secures the pipe 12 to the joist 14 by means of an elongated bracing element 16 which extends between and is secured to the sway brace 10 at one end thereof and to the joist 14 at the other end. It is to be understood that brace 10 could be used to secure various types of fluid pipe and an interior sprinkler line pipe is used herein by way of example only.

The sway brace 10 is comprised of a U-shaped flat metal band 18 adapted to fit about the pipe 12 and to be secured adjacent its ends to the bracing element 16. One end 20 of band 18 is bent back upon itself so as to define an inverted U-shaped configuration comprising a pair of spaced parallel leg portions 22 and 24 and a bar portion 26. Leg portions 22 and 24 and the other end 27 of the band 18 have axially aligned apertures 28, 30 and 32 respectively extending therethrough which are adapted to receive the elongated bracing element 16.

A bolt member 34 extends through and is in threaded engagement with the bar portion 26 of end 20 of band 18 such that upon clockwise rotation of the bolt member 34, the bolt member extends between the spaced leg portions 22 and 24 of end 20 and abuts the elongated bracing element 16. Further tightening of bolt member 34 pushes the elongated bracing element 16 away from the bar portion 26 of end 20 and against the back sides 28' and 30' of apertures 28 and 30 thereby tightly securing end 20 of band 18 to the elongated bracing element 16. The other end 27 of band 18 is merely held to the bracing element 16 by virtue of the bracing element extending through aperture 32 therein. As seen in FIG. 1, the extended end 36 of the bracing element 16 is affixed to the joist 14 or some other suitable portion of the building structure.

With one end 20 of band 18 being so secured to the elongated bracing element 16, the band 18 extending about pipe 12 and the other end 27 of the band being connected to the bracing element 16, relative sway movement between the pipe 12 and bracing element 16 and thus between pipe 12 and the structure is limited. The length of band 18 is sized such that upon disposing the band 18 about pipe 12 and inserting the elongated bracing element 16 through apertures 28-32 and tightly securing the end 20 of the band to the elongated bracing element, a clearance remains between the fluid pipe 12 and bracing element 16. To prevent the pipe 12 from being pressed directly against the bracing element 16 and thereby possibly damaging pipe 12.

In the preferred embodiment of the invention, the bracing element 16 is comprised of cylindrical steel pipe. One inch schedule 40 black steel pipe has been found to be quite suitable for the bracing element. The aligned apertures 28-30 in the band 18 are sized as to facilitate insertion of the bracing element therethrough and to allow the bolt member 34 to be readily tightened against the bracing element for securing the sway brace 10 to the bracing element 16. With one inch inside diameter pipe, the apertures 28-30 would be about 1.5 inches in diameter to allow about 0.25 inches of play between the bracing element and the band 18. The extended end 36 of the bracing element 16 is preferably flattened to facilitate securement of the bracing element 16 to the joist 14 or other portion of the building structure to which the pipe 12 is to be secured. While the bracing element 16 is preferably a cylindrical pipe, other configurations of elongated bracing elements could be employed and apertures 28-30 would then be similarly configured so as to receive the differently shaped bracing element. As for example, a relative flat rod could be employed as a bracing element and the apertures 28-32 in band 18 would then be rectangularly configurationed and, again, slightly oversized to facilitate the insertion of the element within the band.

Various changes and modifications may be made in carrying out the present invention without departing from the spirit and scope thereof. Insofar as these changes and modifications are within the purview of the appended claims, they are to be considered as part of the present invention.

I claim:

1. A sway brace for use in securing a fluid supply pipe to an elongated bracing element secured to a building structure for limiting relative movement between the pipe and the structure, said sway brace comprising a substantially flat U-shaped band member adapted to be disposed about a portion of the pipe, one end of the band member being bent backwardly to provide said end with an inverted U-shaped configuration comprising a pair of spaced substantially parallel leg portions and a spanning bar portion, the other end of said band member and said leg portions having axially aligned apertures extending therethrough for receiving the elongated bracing element, and securement means carried by said bar portion and extending therefrom between said parallel leg portions such that upon disposing said band member about the pipe and inserting the elongated bracing element through said axially aligned apertures and urging said securement means against said elongated bracing element, said securement means urges the elongated bracing element against said leg portions of said band member thereby securing said one end of said band member to the elongated bracing element and concurrently securing the pipe to the elongated bracing element and the structure.

2. The combination of claim 1 wherein the length of said band member is sized in relation to the diameter of the pipe such that upon disposing said band member about the pipe, inserting the elongated bracing element through said apertures and securing said one end of said band member to the elongated bracing element, the pipe is spaced from the elongated bracing element.

3. A sway brace assembly for use in securing a fluid supply pipe to a building structure for limiting relative movement therebetween, said assembly comprising an elongated bracing element, one end thereof being adapted to be secured to the building structure, a substantially flat U-shaped band member adapted to be disposed about a portion of the fluid supply pipe, one end of said band member being bent backwardly to provide said end with an inverted U-shaped configuration comprising a pair of spaced substantially parallel leg portions and a bar portion, said bar portion spanning said leg portion, the other end of said band member and said leg portions having axially aligned apertures extending therethrough for receiving said elongated bracing element, and bolt means in threaded engagement with said bar portion and extending therefrom between said leg portions such that upon securing said bracing element to the building structure, disposing said band member about the fluid supply pipe and disposing said bracing element through said axially aligned apertures and tightening said bolt member, said bolt member abuts said bracing element and urges said bracing element against said leg portions of said band member thereby securing said one end of said band member to said bracing element and securing the pipe to the building structure to limit relative movement therebetween.

4. The combination of claim 3 wherein said elongated bracing member comprises a cylindrical pipe, the diameter of said pipe being less than the diameter of said axially aligned apertures and including means defined by one end of said pipe for securing said pipe to the structure.

* * * * *